United States Patent Office 3,725,096
Patented Apr. 3, 1973

3,725,096
ADHESIVE COMPOSITION
Joseph G. Stanke, 1220 2nd St. N.,
Wisconsin Rapids, Wis. 54494
No Drawing. Filed Mar. 29, 1971, Ser. No. 129,260
Int. Cl. C04b 7/02
U.S. Cl. 106—90          13 Claims

ABSTRACT OF THE DISCLOSURE

An adhesive composition comprising the combination of crude tall oil, cement and an aqueous solution of ammonium hydroxide. The cement is used in the ratio of 1 to 3 parts per part of tall oil and the ammonium hydroxide solution is used in the ratio of 1 part to 6 to 10 parts by weight of the cement. The composition cures or sets to provide an infusible product which can be used as an adhesive, a surface coating or a binder for reinforcing materials.

BACKGROUND OF THE INVENTION

Tall oil is the byproduct of the Kraft process for pulping pine wood. In the Kraft or sulfate process, pine wood chips are digested with a solution of sodium hydroxide and sodium sulfide under heat and pressure. The mixed alkali dissolves the resinous constituents holding the cellulose fiber together, thus freeing the cellulose fiber for further processing. The resinous portion is a mixture made up primarily of lignin with smaller quantities of resin acids and fatty acids. The alkaline cooking solution converts these acidic materials to soluble sodium salts which are washed from the pulp as a dark colored solution called "black liquor."

In the conventional Kraft process the black liquor is concentrated to a level that permits easy burning. As the black liquor is concentrated the sodium salts of the resin acids and fatty acids tends to float because of their lowered solubility in the increased salt concentration. The floating materials, called "skimmings" are reacted with sulphuric acid to produce sodium sulfate and a mixture of free resin acids and fatty acids. This mixture is referred to as crude tall oil.

Because of the resin and fatty acid components, many attempts have been undertaken to recover these materials from crude tall oil. Distillation techniques have been utilized to permit the separation of pale rosin. However, the rapid growth of the Kraft industry in recent years has provided an ever increasing source of crude tall oil, and even though good separation techniques have been available, the value of the crude tall oil has remained low.

Due to ecology factors the crude tall oil cannot be readily disposed of and therefore, it is more imperative than ever to provide a product which can utilize the increasing surplus of tall oil.

In the past tall oil has found a limited use as an additive to cement to improve the properties of concrete and particularly its resistance to freezing and thawing. However, this use has been extremely limited because only very small quantities of tall oil are required to modify the cement.

SUMMARY OF THE INVENTION

The invention is directed to an improved low cost adhesive composition which can be used as a binder, or as a surface coating. The composition comprises the combination of crude tall oil, cement and an aqueous solution of ammonium hydroxide. When these ingredients are blended together an exothermic reaction occurs, and the composition will cure or set to provide an infusible product.

The composition has wide use as an adhesive or binder or as a surface coating. The composition can be used to bond materials such as metal, ceramic or glass, wood, concrete, and the like, and has particular application in the building industry for bonding polystyrene or polyurethane panels to walls or structural members. In addition, the composition has use as a binder for fiber or granular reinforcement or fillers and can be used in the lamination or winding of fiber reinforced products. With or without the addition of a filler, the composition can be used as a molding or patching compound for patching wood, concrete, metal, or the like. Without the use of fillers, the composition can be used as a hard, protective surface coating which can be applied to wood, plastic, metal and other materials.

The composition of the invention has a decidedly lower cost than conventional thermosetting resin adhesives. In general, the phenolic resins are the lowest cost and the present composition can be prepared for approximately one-quarter to one-third of the cost of conventional phenolic resins.

As a further advantage, the composition of the invention will cure at room temperature so that no additional or auxiliary heating is required to cause the material to set to the infusible cured state.

The composition is non-toxic so that in the uncured state it can be readily handled or molded without danger of skin irritation. The composition will not support combustion and thus can be used in applications where fire retardant properties are desired.

DESCRIPTION OF THE PREFERRED EMBODIMENT

The composition of the invention comprises the combination of crude tall oil, cement and an aqueous solution of ammonium hydroxide.

As previously mentioned, crude tall oil is a mixture of free resin acids and fatty acids derived from the Kraft paper process.

The cement can either be Portland cement or waterproof masonry cement and is used in a weight ratio of about 1 to 3 parts of cement to 1 part of crude tall oil. When the composition is to be used as an adhesive or binder, the cement is preferably used in a ratio of about 1.14 parts to each part of the tall oil. When the composition is to be used as a surface coating, a more viscous composition is desired so that the cement is preferably used in the ratio of about 2 parts to each part of tall oil. When used as a binder in a molding composition, a higher proportion of cement is utilized, generally in a weight ratio of about 3 parts to each part of tall oil.

The concentration of the ammonium hydroxide solution can vary from about 1% to 35% by weight and based on a 3% aqueous solution, the ammonium hydroxide is used in a weight ratio of 1 part to 6 to 10 parts of cement, and preferably a weight ratio of 1 part to 8 parts of cement. If the concentration of the ammonium hydroxide solution is greater or less than 3%, the weight ratio of the aqueous ammonium hydroxide solution can be correspondingly varied. For example, if the ammonium hydroxide is employed as a 6% solution, the ammonium hydroxide solution will be used in the weight ratio of 1 part to 3 to 5 parts of the cement.

The aqueous solution of ammonium hydroxide is believed to solubilize or saponify the fatty acids and resin acids so that the mixture can be more readily blended together. It has been found that without the ammonium hydroxide the cured or set composition will tend to crystallize.

The composition of the invention can be used as an adhesive for bonding various articles of wood, metal, concrete, plastic, or it can be used as a binder for fibrous reinforcement in filament winding or laminating processes. The fiber reinforcement can take the form of mineral fibers, such as glass or asbestos; vegetable fibers, such as cotton; synthetic fibers, such a nylon, rayon. Orlon or Dacron; animal fibers, such as wool; or metal fibers such as steel wire. The fiber reinforcement can be in the form of substantially continuous strands or yarns, woven fabrics, braided tubing or haphazardly arranged short or chopped fibers.

When used as a binder for fiber reinforced products, the adhesive composition of the invention will generally comprise from about 65 to 85% by weight of the reinforced product.

If the composition is to be used as a binder in a molding or patching material, short fibrous or particulate fillers can be incorporated with the composition. In this situation, short or chopped lengths of the above mentioned fibrous materials can be utilized, or alternately particulate or granular materials such as sand, sawdust, fly ash, carbon, diatomaceous earth, fuller's earth, mica, talc, etc., can be utilized. In a molding or patching material, the binder will comprise from about 30% to 99% by weight of the material.

The particle size of the filler can vary widely depending on the use of the composition. For most applications the particle size of the filler will be smaller than 200 mesh (74 microns) and preferably smaller than 400 mesh (37 microns).

In certain applications where the composition may be subjected to extreme weather conditions, a small amount of zinc oxide can be incorporated in the composition to prevent crazing. The zinc oxide is used in the amount of 1 to 3 parts of zinc oxide per 16 parts of the composition.

No special technique is required for preparing the composition and the ingredients can be mixed individually at the time of use, or preferably, a two component system can be employed in which the crude tall oil and the aqueous ammonium hydroxide solution, and the filler and zinc oxide, if used, are premixed as one component, and the cement constitutes the second component. At the time of use the two components are mixed together.

Following mixing, an exothermic reaction occurs in which the composition is warm to the touch. Depending on the specific formulation utilized, curing or setting can occur in a period of 4 minutes to 24 hours. As the reaction is exothermic no auxiliary heat is required for curing of the composition.

The composition of the invention has a wide variety of uses. With or without the addition of reinforcement or fillers, the composition has particular application as an adhesive in the building industry. More specifically, the material can be utilized to bond polystyrene foam sheets to concrete or other wall surfaces.

With or without the addition of a filler, the composition can be used as a patching or molding material for either molding art form objects or aticles of commerce, or for patching holes or defects in wood, metal, plastic, concrete, or the like. As the composition is waterproof it can be exposed to water or moisture during service. As previously mentioned, if the composition is to be exposed to extreme weather conditions, zinc oxide can be incorporated in the composition.

The adhesive composition of the invention is substantially less costly than conventional resin adhesives. The crude tall oil is the byproduct of the Kraft paper process and as such is readily available and inexpensive. Similarly, cement and ammonium hydroxide are inexpensive so that the composition can be prepared for costs considerably below that of conventional thermosetting resins.

The following examples illustrate the preparation and use of the composition of the invention:

EXAMPLE I

One pound of 3% aqueous solution of ammonium hydroxide was mixed with 7 pounds of crude tall oil and this mixture was blended with 8 pounds of Portland cement. The resulting composition was a relatively viscous material and was used as an adhesive to bond polystyrene sheets together. The adhesive set in a period of about 4 minutes.

EXAMPLE II

Two pounds of a 3% aqueous solution of ammonium hydroxide was mixed with 7 pounds of crude tall oil. Subsequently, this mixture was blended with 16 pounds of cement and the resulting material was applied to the surface of metal and concrete. After setting of the composition, a hard smooth surfaced coating resulted.

EXAMPLE III

Three pounds of 3% aqueous solution of ammonium hydroxide, 7 pounds of tall oil and 10 pounds of short glass fibers were blended together. Subsequently 24 pounds of cement was blended into the mixture and the resulting composition was used as a molding and patching material.

EXAMPLE IV

To provide a surface coating to be exposed to extreme weather conditions, 2 pounds of zinc oxide were added to the formulation shown in Example II. When applied to metal and concrete surfaces, a smooth dense coating resulted which provided protection for the base material without crazing when exposed to weather for a period of 33 months.

Various modes of carrying out the invention are contemplated as being within the scope of the following claims distinctly pointing out and particularly claiming the subject matter which is regarded as the invention.

I claim:

1. A composition of matter having use as an adhesive, consisting essentially of crude tall oil, cement in a weight ratio of 1 to 3 parts of cement per part of tall oil, and an aqueous solution of ammonium hydroxide in a weight ratio, based on a 3% ammonium hydroxide solution, of 1 part of said solution to 5 to 10 parts of hydraulic cement, said material reacting to provide an infusible adhesive composition.

2. The composition of claim 1, and including a generally inert filler material, said composition being present in an amount of 30% to 99% by weight of the combined weight of the filler and said composition.

3. The composition of claim 2, wherein said filler is a fibrous material and said composition is present in an amount of 65% to 85% by weight of the combined weight of the filler and said composition.

4. The composition of claim 2, wherein said filler is a particulate filler.

5. The composition of claim 4, wherein the particulate filler has an average particle size smaller than 200 mesh.

6. The composition of claim 1, and including from 1 to 3 parts of zinc oxide per 16 parts of said composition.

7. The composition of claim 1, wherein said cement is waterproof masonry cement.

8. The composition of claim 1, wherein said aqueous ammonium hydroxide solution has a concentration in the range of 5 to 35% by weight.

9. A composition comprising, crude tall oil, cement in a weight ratio of 1 to 3 parts of cement to one part of tall oil, said cement being selected from the group consisting of Portland cement and masonry cement, and an aqueous solution of ammonium hydroxide, said solution having a concentration of 5 to 35% by weight and said solution being used in a weight ratio of 1 part of said solution to 6 to 10 parts of cement based on a 3% ammonium hydroxide solution.

10. The composition of claim 9, and including a generally inert filler dispersed within said composition to provide a mixture, said composition comprising from 30 to 99% by weight of the mixture.

11. The composition of claim 9, wherein the composition has the following formulation in parts by weight: crude tall oil, 7; cement, 8; and aqueous solution of ammonium hydroxide, 1.

12. The composition of claim 9, wherein the cement is used in a weight ratio of about 2 parts per part of crude tall oil, said composition having use as a surface coating.

13. The composition of claim 10, wherein the cement is used in a weight ratio of about 3 parts per part of crude tall oil, said mixture having use as a molding and patching material.

References Cited

UNITED STATES PATENTS

| 2,510,776 | 6/1950 | Gabrielson | 106—95 |
| 2,504,579 | 4/1950 | Perl | 106—93 |
| 2,420,144 | 5/1947 | Mark | 106—95 |
| 2,311,289 | 2/1943 | Booth | 106—95 |

JAMES E. POER, Primary Examiner

U.S. Cl. X.R.

106—95, 97